(No Model.)
J. R. HANLON.
LUNG POWER TESTER AND DEVELOPER.
No. 524,899. Patented Aug. 21, 1894.
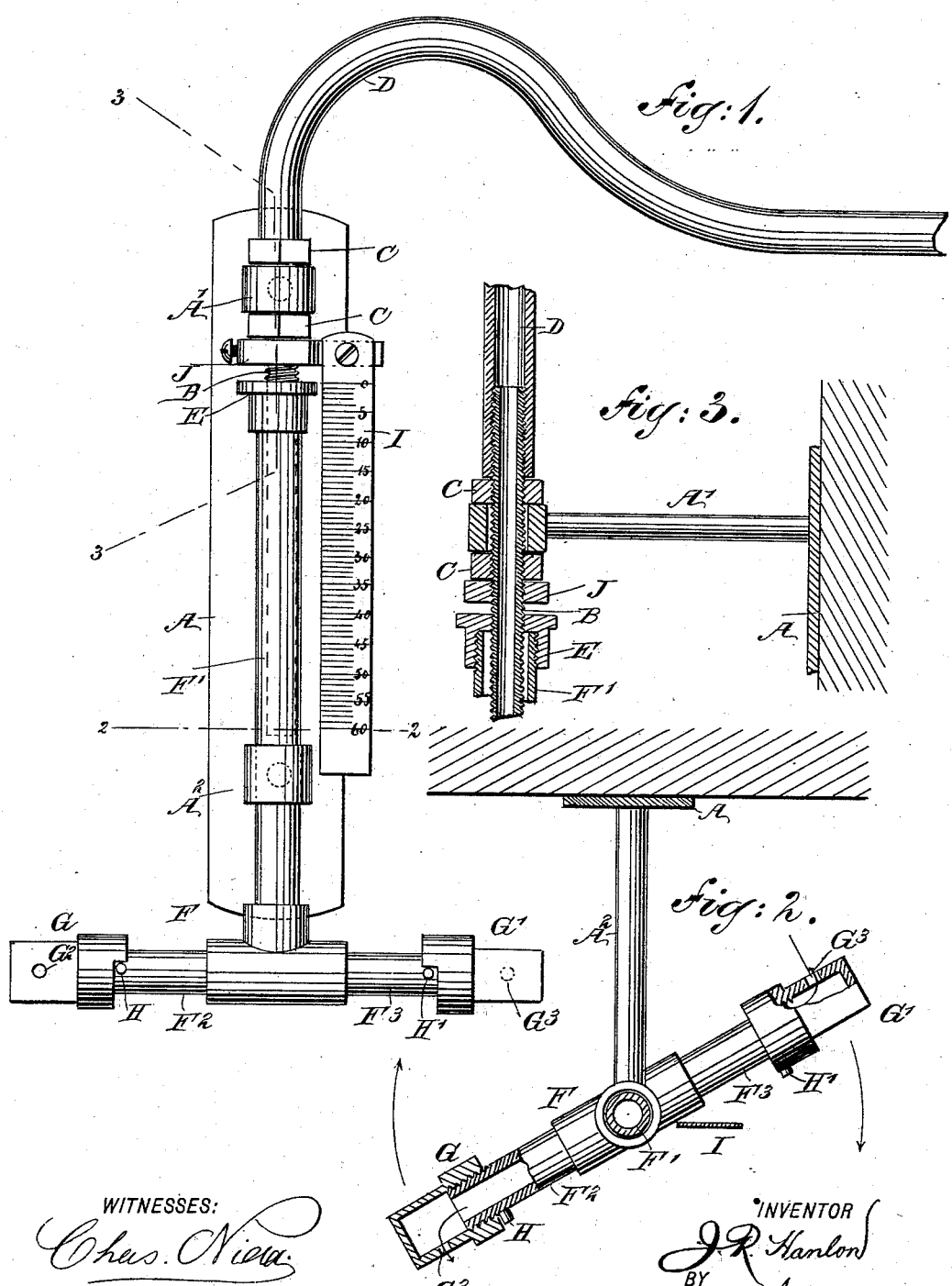

UNITED STATES PATENT OFFICE.

JOHN RUSSELL HANLON, OF PENNINGTON, NEW JERSEY.

LUNG-POWER TESTER AND DEVELOPER.

SPECIFICATION forming part of Letters Patent No. 524,899, dated August 21, 1894.

Application filed October 27, 1893. Serial No. 489,270. (No model.)

*To all whom it may concern:*

Be it known that I, JOHN RUSSELL HANLON, of Pennington, in the county of Mercer and State of New Jersey, have invented a new and Improved Lung-Power Tester and Developer, of which the following is a full, clear, and exact description.

The object of the invention is to provide a new and improved lung power tester and developer, which is simple and durable in construction, very effective in operation, and arranged to enable the user to measure the power of his lungs and to gradually develop the same by properly exercising with the device.

The invention consists of a fixed, threaded pipe adapted to connect with the air supply tube, and a T-shaped pipe screwing on the said threaded pipe and provided at its ends with air outlets arranged on opposite sides.

The invention also consists of certain parts and details, and combinations of the same, as will be fully described hereinafter and then pointed out in the claims.

Reference is to be had to the accompanying drawings, forming a part of this specification, in which similar letters of reference indicate corresponding parts in all the figures.

Figure 1 is a front elevation of the improvement. Fig. 2 is a sectional plan view of the same on the line 2—2 of Fig. 1; and Fig. 3 is a sectional side elevation of the same on the line 3—3 of Fig. 1.

The improved lung power tester is provided with a suitably constructed plate A, adapted to be fastened to a wall or other support, and provided with two arms A' and A², extending forward, and of which the arm A' forms a passage for the threaded pipe B, held in place on the arm by two nuts C, abutting against the top and bottom of the front end of the arm. The upper end of the threaded pipe B, is connected with a tube D, into which the air is blown to test the power and develop the lungs, as hereinafter more fully described.

On the threaded pipe B, screws a nut E fastened on the upper end of the vertical arm F', of a T-shaped pipe F having arms F² and F³ provided with heads G and G' respectively, having apertures G² and G³ respectively, arranged on opposite sides so that air passing through the T-shaped pipe F, passes out on opposite sides of the heads G and G', whereby a turning motion is given to the pipe F, as is well known. The heads G and G', can be given a half turn so as to change the relative positions of the apertures G² and G³, to cause the pipe F to turn in either direction. The movement of the heads G and G', is limited by stop pins H and H' respectively, secured on the arms F² and F³ respectively, of the pipe F. The nut E serves as an indicator, and for this purpose indicates on a scale I, arranged alongside the arm F' of the tube F, and supported on a bracket J, attached to the pipe B, next to the lowermost nut C.

The operation is as follows: When the several parts are in the position illustrated in Fig. 1, then the nut E indicates with its upper edge zero on the scale I, and when the operator now blows into the supply pipe D, the air passes into the threaded pipe B, and from the latter into the pipe F, to finally pass from the branch arms F² and F³, into the heads G and G' respectively, and out of the same through the apertures G² and G³, so that a turning motion is given to the pipe F. This movement of the pipe F, causes its nut E to screw down on the pipe B, so that the entire pipe F besides being turned, moves downward. The distance the nut E and pipe F move downward, depends on the power of the air blown into the tube D, the amount being indicated by the upper edge of the nut E on the scale I.

It is understood that the pipe F', extends vertically and turns loosely in the arm A² projecting from the plate A, so that the pipe F is guided in its downward movement. When the pipe F has come to rest, after the pressure of the air in the tube D ceases, then the operator gives the heads G and G' a half turn to bring their respective apertures G² and G³ in an opposite position, and when the operator now again blows into the tube D, the air passes through the pipe F, and heads G and G', but causes the pipe F to turn in an opposite direction, so that the nut E screws up on the pipe B.

It is understood that it requires more power to return the pipe F than it does to move it downward, as on the return movement of the pipe, the weight of the latter and its head has to be lifted.

The graduation on the scale I, is preferably so arranged that each degree indicates a turn of the pipe F, that is the pitch of the thread on the pipe B is indicated by the graduation.

Having thus fully described my invention, I claim as new and desire to secure by Letters Patent—

1. A lung power tester and developer, comprising a fixed tube adapted to be connected with an air supply tube, and a T-shaped pipe having its vertical member fitted to turn and travel up and down on the fixed tube and provided at the ends of its horizontal members with air outlets on opposite sides, substantially as and for the purpose set forth.

2. A lung power tester and developer comprising a fixed threaded pipe adapted to be connected with an air supply tube, and a T-shaped pipe having its vertical member internally screw threaded to receive the threaded pipe and provided at the ends of its horizontal members, on opposite sides, with air outlets, whereby the T pipe will be caused to turn and travel up and down on the fixed pipe by the passage of air through the same, substantially as described.

3. A lung power tester and developer, comprising a fixed threaded pipe adapted to be connected with an air supply tube, and a T-shaped pipe having the upper end of its vertical member internally screw threaded to receive the fixed pipe and provided with reversible air outlet heads on the outer ends of the horizontal members, substantially as described.

4. A device of the class described, comprising a fixed, threaded pipe adapted to be connected with the air supply tube, a T-shaped pipe screwing with its vertical member on the said threaded pipe, and provided at the ends of its branch arms with air outlets arranged on opposite sides, and a scale arranged alongside the vertical part of the said T-shaped pipe, substantially as shown and described.

5. A device of the class described, comprising a fixed, threaded pipe adapted to be connected with the air supply tube, a nut screwing on the said threaded pipe, a T-shaped pipe secured with its vertical member in the said nut, reversible heads held on the branch arms of the said T-shaped pipe, each head being provided with an air outlet, and a scale supported from the said pipe and extending along the vertical member of the said T-shaped pipe, substantially as shown and described.

JOHN RUSSELL HANLON.

Witnesses:
T. D. DURLING,
RACHEL WATERMAN.